United States Patent [19]

Dickinson

[11] Patent Number: 4,756,205
[45] Date of Patent: Jul. 12, 1988

[54] GEAR SHIFTER FOR MANUAL TRANSMISSION SYSTEMS

[75] Inventor: James L. Dickinson, Naugatuck, Conn.

[73] Assignee: Alinabal, Inc., Milford, Conn.

[21] Appl. No.: 10,096

[22] Filed: Feb. 2, 1987

[51] Int. Cl.⁴ .............................................. G05G 9/16
[52] U.S. Cl. ........................... 74/473 R; 74/471 XY; 74/473 P
[58] Field of Search ........... 74/471 XY, 473 R, 473 P

[56] References Cited

U.S. PATENT DOCUMENTS

| | | | |
|---|---|---|---|
| Re. 31,451 | 11/1983 | Osborn | 74/473 R X |
| 3,287,071 | 11/1966 | Tucker | 308/72 X |
| 3,479,899 | 11/1969 | Romi | 74/473 R |
| 3,517,568 | 6/1970 | Payerle | 74/471 XY |
| 3,808,907 | 5/1974 | Yamaguchi | 74/473 R X |
| 4,143,560 | 3/1979 | Kinkade et al. | 74/473 R |

FOREIGN PATENT DOCUMENTS

| | | | |
|---|---|---|---|
| 1108045 | 10/1955 | France | 74/471 XY |
| 57-157320 | 9/1982 | Japan | 74/473 R |
| 979574 | 1/1965 | United Kingdom | 74/473 R |

Primary Examiner—Allan D. Herrmann
Attorney, Agent, or Firm—Pennie & Edmonds

[57] ABSTRACT

A gear shifter for manual transmissions which includes a support, two movable members movable at right angles to each other, and a gear shift lever connected through the movable members and to a bell crank pivotally mounted on the support. The bell crank and one of the movable members are connected to one end of a pair of actuators, the other ends of which are connected to the transmission. The gear shift lever is mounted for movement in two directions at right angles to each other and the connection of the gear shift lever to the movable members and bell crank translates these two right angle movements into parallel movement of the two actuators.

16 Claims, 6 Drawing Sheets

GEAR SHIFTER FOR MANUAL TRANSMISSION SYSTEMS

BACKGROUND OF THE INVENTION

The present invention relates to a gear shift mechanism for manually shifting the gears of a transmission system. The shifter is typically used in the automotive field for shifting between the various forward gears and reverse, the shifter being moved in an H or similar pattern depending on the number of forward gears. Movement of the appropriate mechanisms in the transmission is controlled by cables extending between the transmission and the shifter.

With a gear shifter employing the H pattern, for example, it is necessary to convert the two axis motion of the gear shift lever along the legs of the H and across the center bar of the H into substantially parallel motions of the two cables. Prior art shifter constructions for permitting this movement require special configurations of the various parts of the shifter which are somewhat unique for each transmission design. Also, the forming of these component parts requires the use of dedicated tooling to cut and shape and form the geometry of the component by bending and drawing operations. Present constructions also frequently require many welds to hold the component parts together; and modification to design constraints require retooling of the production facility to fabricate the new design.

As one example of the prior art constructions described above, reference is made to U.S. Pat. No. Re. 31,451. The shifter there disclosed includes a complicated array of component parts and a complicated system of multiple pivoting of the different parts of the mechanism to effect parallel movement of the transmission actuation cables. Not only are the individual component parts stamped to unique design configurations, the different parts have to be individually pivotally mounted. In particular, the gear shift lever is attached to a handle bracket which is pivotally mounted in a carrier for movement about one axis. The carrier itself is, in turn, mounted in a support structure for pivoting about a second orthogonal axis. In addition, a separate bell crank member is required and must be mounted for pivoting about a third axis which is canted with respect to the other two axes. A separate drive pin and articulated connection is then required between the carrier and the bell crank in order to complete the shift mechanism.

Other similar constructions for shifting gears are disclosed in U.S. Pat. Nos. 3,808,907 and 4,143,560. As with the construction of the reissue patent, the gear shifting mechanisms of these other patents also require that the gear shift lever be mounted on another member which in turn is pivotally mounted at right angles to the pivoting of the gear shift lever.

SUMMARY OF THE INVENTION

In accordance with the teachings of the present invention, a gear shifter mechanism of simplified construction is provided. The geometry of the construction allows a multitude of custom installations with only minor design changes. The shifter utilizes many components of simplified construction and shape which can be manufactured with conventional apparatus and simplified tooling. The component parts can be standardized for most all applications.

Generally, the shifter of the present invention includes a shift level which is pivotally mounted for movement in an H pattern with the legs of the H representing, for example, the north-south direction and the center bar of the H representing the east-west direction. It is to be noted here that reference to an "H" pattern includes variations of this pattern. For example, a three-speed transmission would require a true H pattern of movement of the shifter whereas a five-speed transmission would include a third center leg in the H pattern.

In accordance with the teachings of the present invention, a first movable shift member is connected to the shift lever for constrained movement in the north-south direction as the shift lever is moved along the legs of the H pattern. A bell crank member is pivotally mounted on the support structure of the shifter and attached directly to the shift lever. This attachment is such that there is no movement of the bell crank as the shift lever moves along the legs of the H. There is, however, a rotational movement of the bell crank as the shift lever moves in the east-west direction across the center bar of the H. Both the movable shift member and the bell crank are adapted to be connected to actuating cables, the other ends of which are connected to the appropriate mechanisms in the transmission for effecting gear selection and shifting. The attachment of the cable to the bell crank is such as to cause it to move with a component of motion in the same direction as the cable attached to the shift member as the bell crank rotates about its pivotal mounting.

In one embodiment of the invention, the movement of the shift lever is constrained in both the north-south direction and the east-west direction. The east-west constraint is effected by a second movable member which is mounted for sliding movement at right angles to the first movable shift member. In a second embodiment, the movement of the shifter is only constrained when it moves in the north-south direction. The second movable member is eliminated and the shifter connected directly to the bell

DESCRIPTION OF THE PREFERRED EMBODIMENTS

Figure 1:
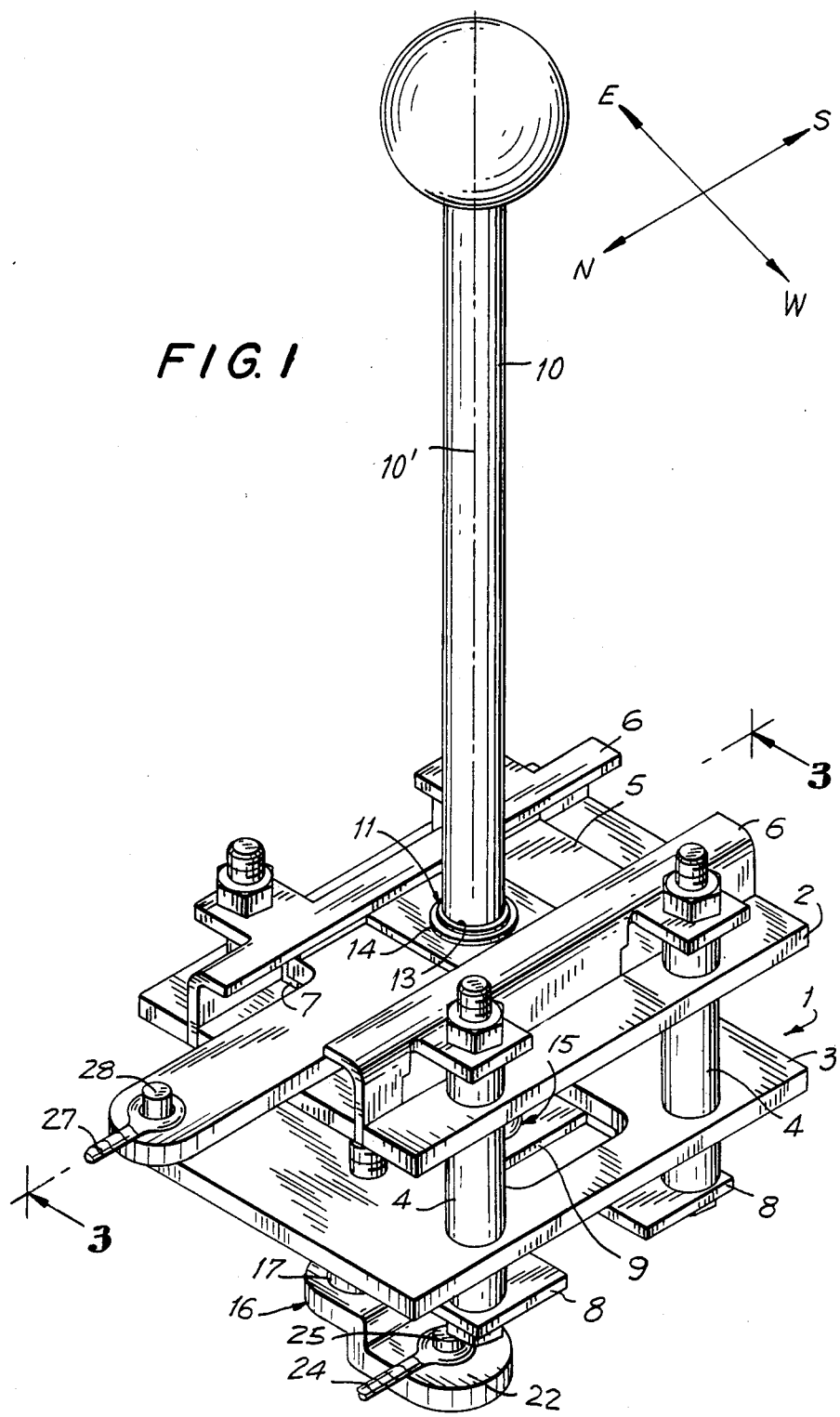
FIG. 1 is a perspective view of the preferred embodiment of the shifter of the present invention.
Figure 2:
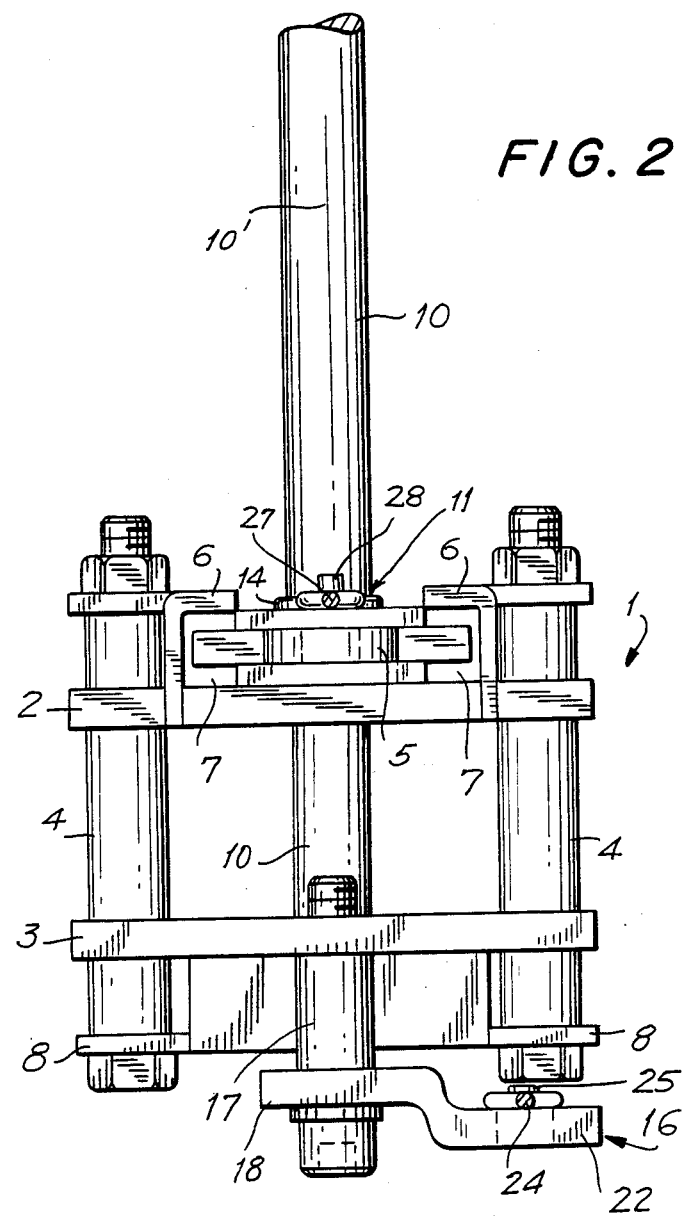
FIG. 2 is an end view of the shifter shown in FIG. 1.

Referring to FIG. 1, the gear shifter of the present invention includes a support 1 comprised of a pair of plates 2 and 3 connected together in spaced relationship by the spacer bolts 4. On the upper plate 2, an upper movable shift member 5 is slidably mounted for linear motion. As represented by the north-south, east-west direction marks, the sliding motion of the shift member is in the north-south direction. Channel members 6 are connected to the upper plate 2 and cooperate with the plate for containing elongated bearings 7 (see FIG. 2). The lower plate 3 also has a pair of channel members 8 attached to it for similarly containing elongated bearings 7 for slidably mounting a lower slide plate 9. The channels 8 extend in the east-west direction, at right angles to the channels 6, and constrain the movement of the slide plate 9 to the east-west direction.

An elongated shift lever 10, having a longitudinal axis 10', extends through both the upper shift member and the lower slide member, the latter members being spaced axially along the shift lever. The shift lever is mounted on the upper shift member by means of a spherical bearing assembly 11. This assembly includes a spherical metal ball 12 having a central bore 13 through which the shift lever 10 extends. The assembly also includes an outer housing 14 secured to the sliding shift member 5. The housing has an inner spherical surface complementary to the surface of the ball for supporting the ball for universal rotational movement. Preferably, the spherical bearing assembly is a molded assembly of the construction shown in U.S. Pat. No. 3,287,071. The shift rod also extends through a bearing assembly 15 in the lower slide member 9. This bearing assembly is identical in construction to the bearing assembly 11. The shift rod is fixed against axial sliding movement in the upper bearing assembly 11 and extends in axial sliding relation through the lower bearing assembly 15.

The above construction permits pivoting of the shift lever in the upper bearing assembly 11 to effect linear sliding movement of the shift plate 5 in the north-south direction with the shift lever moving with the sliding member. At the same time, the shift lever will both pivot and slide axially in the lower bearing assembly 15. The construction further permits pivoting of the shift lever in the bearing assembly 11 in the east-west direction with simultaneous pivoting and axial sliding in the lower bearing assembly 15 to cause slide member 9 to slide in this direction. Since the slide member 9 is constrained by its mounting in the channel bearing structure 7, 8 to move in the east-west direction, the shift lever is similarly constrained to move with the slide member 9 in this direction.

Figure 3:
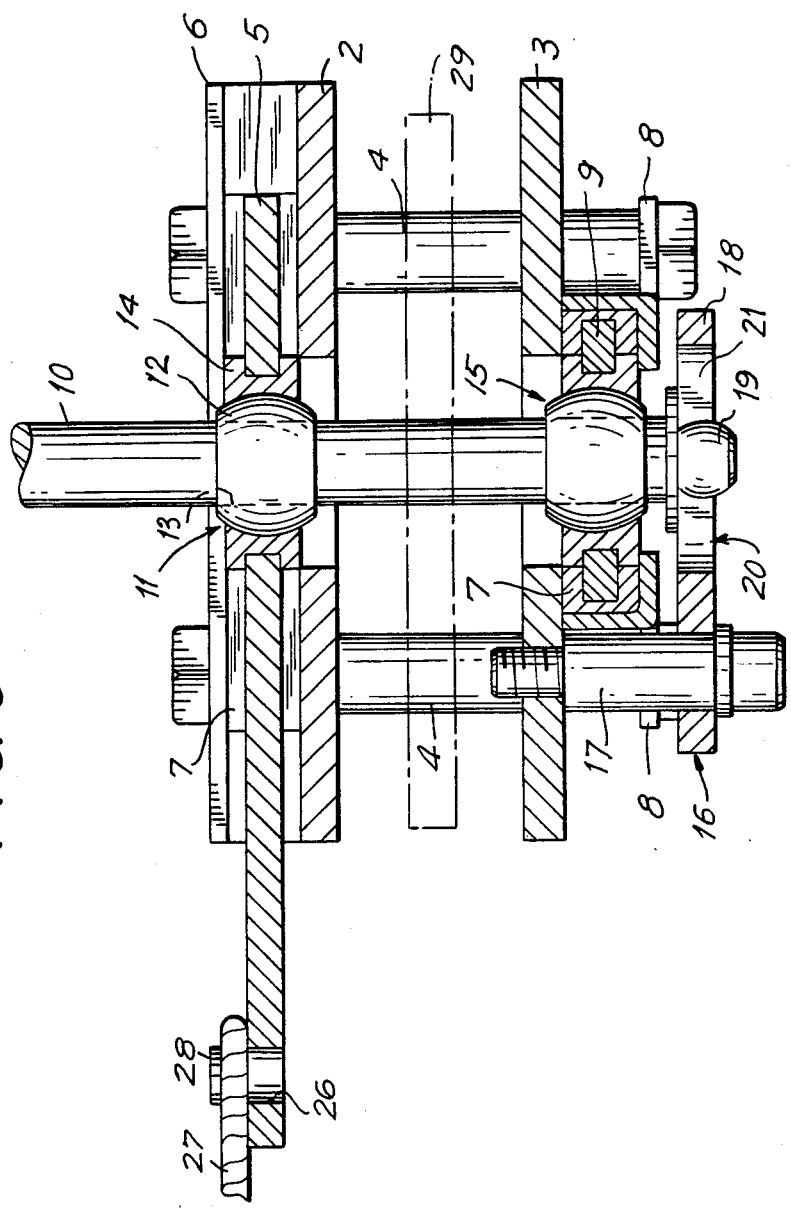
FIG. 3 is a side cross-sectional view of the shifter taken along lines 3—3 of FIG. 1.
Figure 4:
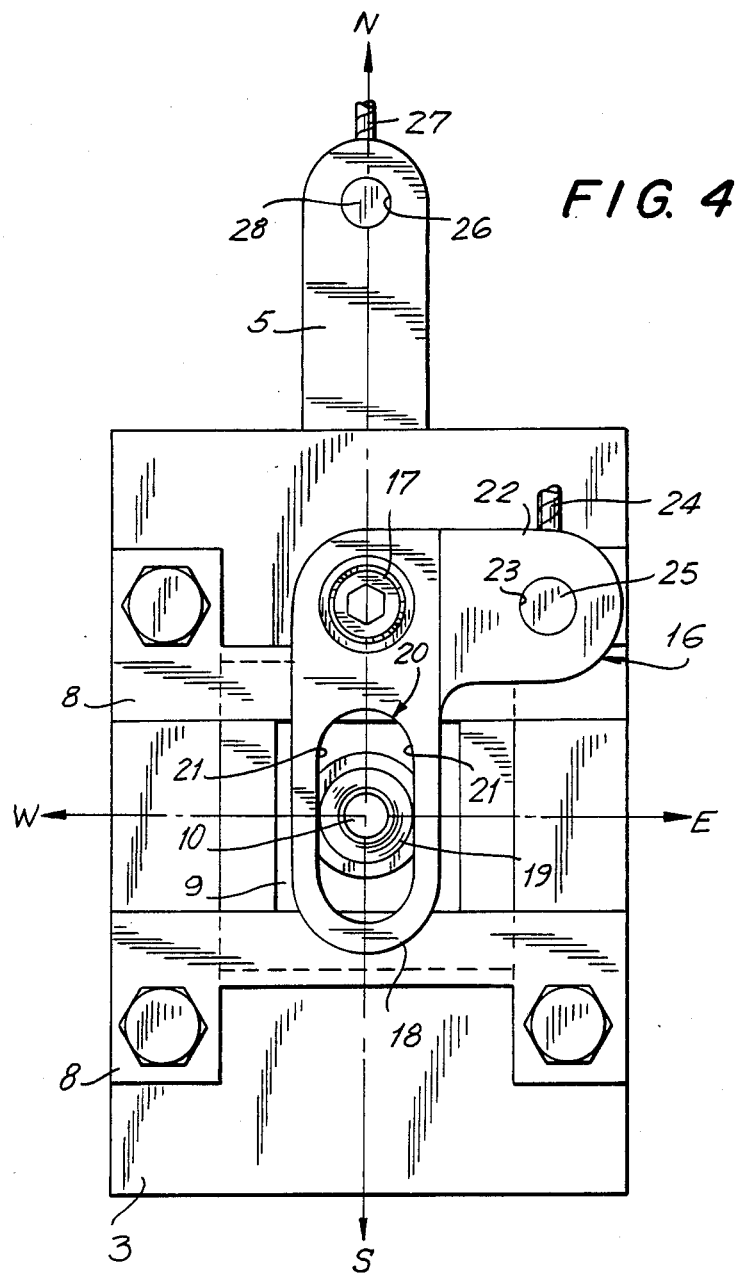
FIG. 4 is a bottom view of the shifter shown in FIG. 1.

A bell crank 16 is pivotally mounted on the lower plate 3 of the support 1 by means of a pivot post 17. This pivot post extends generally parallel to the longitudinal axis of the shift lever 10 and is disposed in the plane of movement of the shift lever in the north-south direction. The bell crank includes two arms extending from the pivot post at right angles to each other. One of these arms 18 normally extends in the north-south direction and is connected to the lower terminal end of the shift lever. This connection, which is most clearly shown in FIG. 3, is by way of a spherical bearing assembly 19 mounted on the shift rod and cooperating with a slot 20 in the arm 18 of the bell crank. The bearing assembly 19 is comprised of a metal spherical ball rotatably attached to the terminal end of the shift lever. This bearing assembly, unlike the bearing assemblies 11 and 15, includes no outer housing. Instead, the ball itself engages along the side walls 21 of slot 20 for universal rotational movement relative to the bell crank. As seen from FIG. 3, the slot and the side walls 21 extend in the north-south direction. The side walls of the slot are spaced from each other by the diameter of the spherical ball 19 so that the spherical ball engages these side walls. With this construction, movement of the bearing assembly 19 in the north-south direction will effect no movement of the bell crank since the slot permits this movement relative to the bell crank. Movement of the bearing assembly 19 in the east-west direction, however, will immediately cause the bell crank to pivot about the pivot post 17.

The other arm 22 of the bell crank extends in the east-west direction. The end of this arm is provided with a bore 23 which provides an attachment means for connecting to the end of an actuator, such as a push-pull cable 24, the other end of which will be attached to the appropriate mechanism in the transmission. This cable will extend in the north-south direction as shown in FIG. 1. The connection to the bore 23 can be by any suitable means such as a pin 25.

The cable 24 attached to the arm 22 of the bell crank will typically be connected to the select mechanism of the transmission for properly aligning a separate gear shift mechanism so that the latter can function to shift gears as the shift lever 10 is moved in the north-south direction. With reference to FIG. 1, the cable extending between the gear shifter and the shift mechanism of the transmission will be attached to the cable attachment bore 26 provided in the upper sliding shift member 5. This cable is shown at 27 as extending in the north-south direction and being attached to the bore by means of a pin 28.

In operation, pivoting of the shift lever 10 in a north-south direction will cause a sliding linear movement of the upper movable shift member 5 in the same direction. Through the connection of the attached cable 27 to the gear shift mechanism of the transmission, such movement will effect shifting of the transmission gears. The particular gears being actuated will depend on the particular leg of the H pattern along which the gear shift lever 10 is moved in the north-south direction.

In moving the gear shift lever in the north-south direction, the lower slide plate 9 will remain stationary. Binding of the shift lever with respect to its bearing mount in this slide plate 9 is avoided by having the shift lever extend through the lower bearing assembly 15 in axial sliding relation with respect thereto. Thus, the increase in distance between the upper bearing assembly 11 and the lower bearing assembly 15 which is created by the linear motion of the upper shift member as it moves in the north-south direction will be compensated for by the axial sliding of the shift lever in the lower bearing assembly.

It should also be noted that movement of the shift lever in the north-south direction will cause the terminal end of the shift lever together with the lowermost bearing assembly 19 to move along the slot 20 of the bell crank 16 without effecting movement of the bell crank. This movement of the terminal end of the shift lever will also have a component of movement in the vertical direction since the terminal end is being pivoted about the upper bearing assembly 11. This motion is accommodated by the slot in the bell crank by providing a sufficient vertical thickness to the bell crank. Thus, the ball 19 will maintain its containment in the slot 20 of the bell crank during pivoting of the shift lever in the north-south direction.

In order to properly position the gear shift mechanism of the transmission for actuating the proper gears, the gear shift lever 10 must be pivoted in the east-west direction. This pivoting will, through the actuator cable 24, operate the gear select mechanism of the transmission to effect the desired result. Movement of the gear shift lever 10 in the east-west direction will cause sliding movement of the lower slide member 9 in the same direction. The elongated bearings in which this slide is mounted constrain the movement of shift lever in the east-west direction.

At the lower end of the shift lever, the bearing assembly 19 will similarly move in the east-west direction. This in turn will cause pivoting of the bell crank 16 about its pivot post 17. With reference to FIG. 3, it will be seen that this movement of the bell crank produces a component of movement of the cable attachment means on the arm 22, in the north-south direction. Thus, the cable 24 will be moved in this direction and generally parallel to the direction of movement of cable 27.

Figure 6:
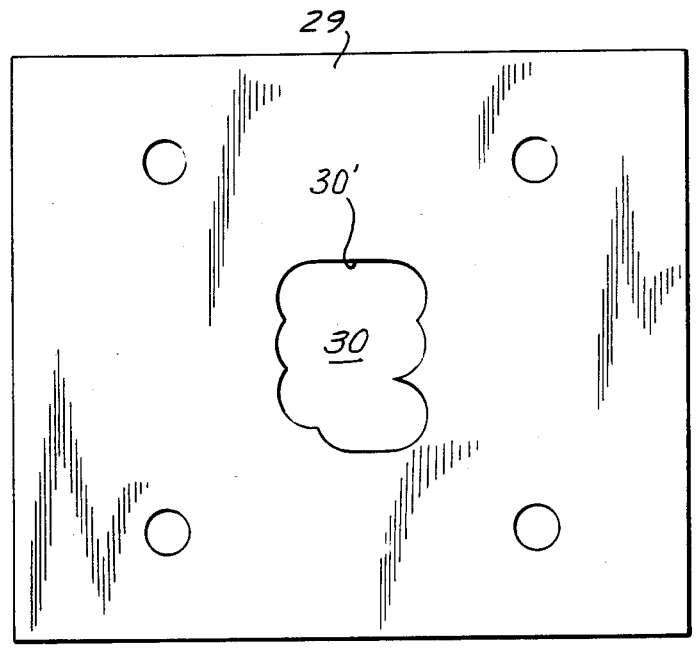
FIG. 6 is a plan view of a gate limiting member which can be employed with the shifter of the present invention to limit the movement of the shift lever.

The gear shifter of the present invention can be fitted with a gate limiting plate such as shown at 29 in FIG. 6. This plate can be attached to the gear shifter between the support plates 2 and 3. FIG. 3 shows the gate limiting plate in phantom lines. The gate limiting plate is provided with a contoured central opening 30 defined by a side wall 30' which is in the path of pivoting movement of the shift lever and which will thus limit its travel in both the north-south and east-west direction. The configuration of the side wall forming the opening 30 will be dependent on the particular pattern to be followed by the gear shift. A different configuration would be used for an H pattern with a central leg than for a simple H pattern of movement of the gear shift. The purpose of the gate limiting plate is to make the shifter self-limiting rather than relying on the gear engagement in the transmission to limit the throw of movement of the gear shift lever. The use of a gate limiting plate will generally result in a reduced gear and synchrowear and prevent greater travel of the gear shift lever as the transmission does wear. This in turn will also increase the life of the actuating cable by preventing overtravel and reducing stress associated by moving the cables to their maximum extension.

Figure 5:
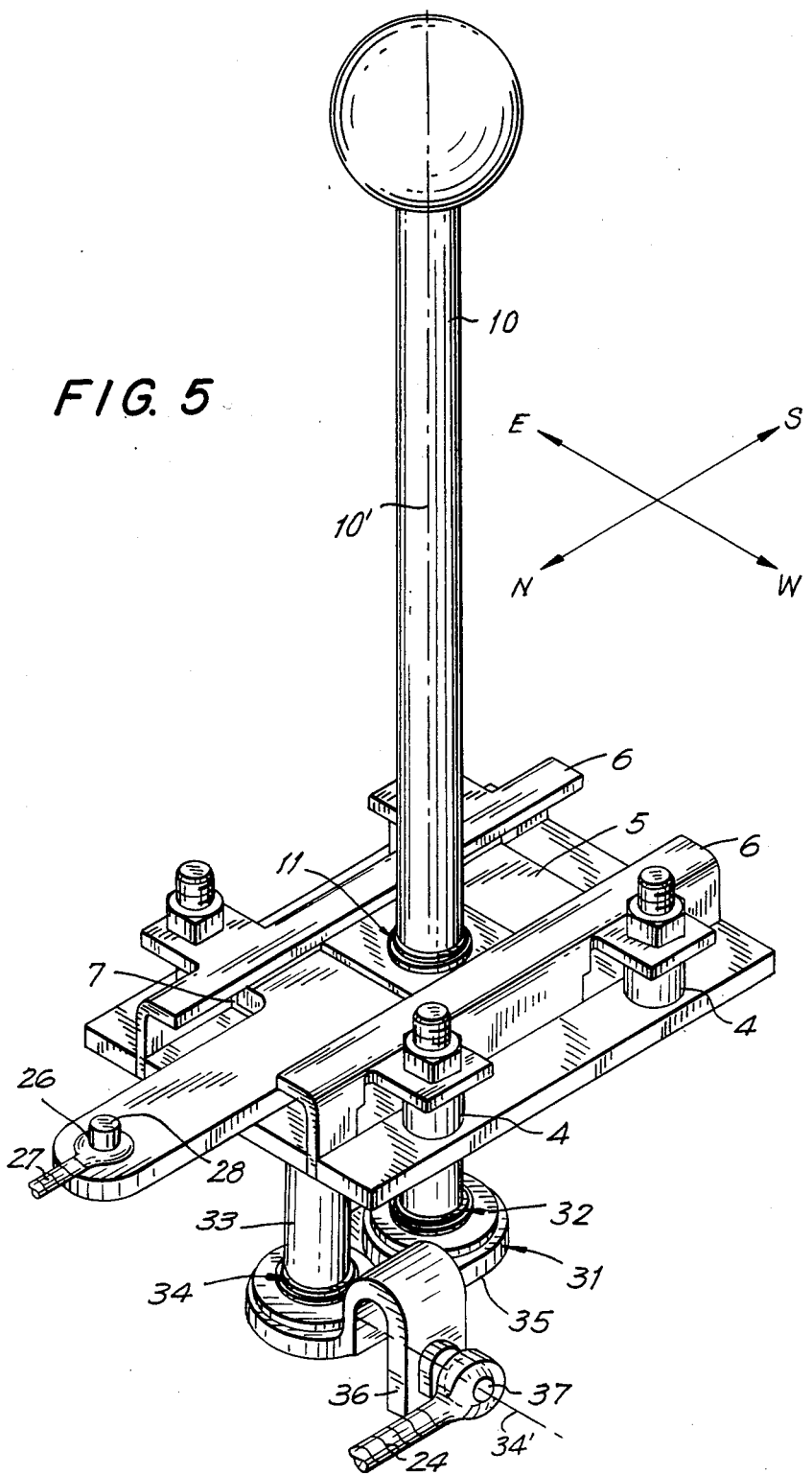
FIG. 5 is a perspective view of a second embodiment of the shifter of the present invention.

In the second embodiment of the invention as shown in FIG. 5, the lower slide plate 9 as employed in the first embodiment is eliminated. The remaining upper structure of the embodiment shown in FIG. 5 is identical to that of FIG. 1 and the same reference numerals are used to designate the same parts.

With the embodiment of FIG. 5, the shift lever is again pivotally mounted on the upper shift member 5 by means of the bearing assembly 11. The shift lever is fixed against axial sliding movement in the bearing assembly 11. As with the embodiment of FIG. 1, pivoting of the shift lever in the north-south direction will cause moving of the shift member 5 in the same direction.

After passing through the upper shift plate 5, the shift lever 10 is connected directly to the bell crank member 31. The connection to the bell crank is through a spherical bearing assembly 32 which is identical in construction to the bearing assembly 11. The shift rod 10 is fixed against axial sliding movement in the bearing assembly 32.

The other end of the bearing assembly is mounted on a pivot post 33 by way of a third bearing assembly 34, identical in construction to the assemblies 11 and 32. Each of the bearing assemblies employed in this embodiment of the invention provides for universal rotational movement at their points of connection. Also, as with the embodiment of FIG. 1, the pivot post 33 for mounting of the bell crank extends generally parallel to the longitudinal axis 10' of the shift lever and is disposed in the plane of movement of the shift lever in the north-south direction. Also, the bell crank includes two arms, one of which 35 extends in the north-south direction and the other of which 36 extends in the east-west direction. At the terminal end of arm 36, a cable attachment means 37 in the form of a ball joint is provided.

In operation of the embodiment shown in FIG. 5, pivoting of the shift lever 10 in the north-south direction will cause the bearing balls of the bearing assemblies 11 and 32 to misalign in their housings from the positions shown in FIG. 5. Since, however, the shift lever 10 is fixed in both of these bearing assemblies, linear movement of the upper assembly 11 with the plate 5 will require that the bell crank 31 pivot about its mounting on the pivot post 33. This pivoting is in a vertical north-south plane and is accommodated by the spherical bearing assembly 34. Pivoting of shift lever 10 in the north-south direction will, at the same time, cause north-south movement of the actuating cable 27 attached at 26 to the sliding member 5.

It is important that shifting of the shift lever in the north-south direction not create any similar motion of the cable attachment 37 as the bell crank 31 pivots in the vertical north-south plane about its spherical bearing 34. This is effected by positioning the attachment means 37 on the axis of rotation 34' of the bearing assembly 34 as the bell crank pivots about its connection to the pivot post 33. This axis of rotation extends in the east-west direction at 90° to the north-south plane in which the bell crank pivots as the shift lever moves in the north-south direction. By attaching the cable to the attachment means 37 through a ball and socket connection, it will simply rotate about the connection point and have no component of movement in the north-south direction as the shift lever moves in this direction.

When the shift lever is moved in the east-west direction, the bell crank 31 will be caused to rotate about the pivot post 33 with a component of movement in the vertical direction. At the same time, the bell crank will be caused to rotate about the vertical axis of the pivot post 33 to effect a component of movement of the attachment means 37 in the north-south direction, thus moving the cable attached thereto in the same direction.

With the fixed axial connection of the shift rod 10 to the bearing assembly 32 in the bell crank 31, movement of the bell crank is a compound movement. A more simplified construction has the gear shift lever 10 slidably mounted for axial movement through the bearing assembly 32. This will permit the bell crank to simply rotate about the vertical axis of the pivot post upon actuation of the shift lever in the east-west direction. Furthermore, no movement of the bell crank would be required upon pivoting of the shift lever in the north-south direction.

I claim:

1. A gear shifter for a manual transmission system comprising:
    (a) a support;
    (b) a first movable member mounted on said support for movement in the north-south direction;
    (c) an elongated shift lever, having a longitudinal axis, pivotally mounted on said first movable member for moving said first movable member in the north-south direction upon pivoting thereof in the north-south direction, said shift lever being pivotable in the east-west direction relative to said first movable member;
    (d) a bell crank pivotally mounted on said support on a pivot post extending generally parallel to the longitudinal axis of said shift lever, said bell crank having two arms extending from said pivot post at an angle to each other;

(e) one arm of said bell crank being connected to the shift lever for pivoting movement relative thereto to cause said bell crank to pivot about its pivot post upon pivoting of said shift lever in a direction having a component of movement in the east-west direction;

(f) first attachment means on said first movable member for connecting to one end of a first actuator for moving said actuator in the north-south direction of movement of said first movable member; and (g) a second attachment means on the other arm of said bell crank for connecting to one end of a second actuator for moving said second actuator with a component of movement in the same direction as said first actuator.

2. A gear shifter according to claim 1 wherein:

(a) said shift lever is pivotally mounted on said first movable member against axial movement along its longitudinal axis; and (b) said shift lever is connected to the one arm of the bell crank for axial sliding movement relative thereto.

3. A gear shifter according to claim 1 wherein:

(a) said shift lever is connected to said first movable member and said bell crank for universal rotational movement relative thereto.

4. A gear shifter according to claim 3 wherein:

(a) said first movable member is mounted on said support for sliding linear movement in the north-south direction; and (b) only said first movable member and said bell crank are connected to said shift lever.

5. A gear shifter according to claim 1 wherein:

(a) said first movable member is mounted on said support member for sliding linear movement in the north-south direction;

(b) said shift lever is pivotally mounted on said first movable member and to said bell crank for universal rotational movement relative thereto and against relative axial movement along its longitudinal axis;

(c) said pivot post is disposed in the plane of movement of said shift lever in the north-south direction; and (d) said bell crank is mounted on said pivot post for universal rotational movement.

6. A gear shifter according to claim 5 wherein:

(a) the one arm of the bell crank is mounted on the pivot post to pivot in the north-south plane as the shift lever pivots in the north-south direction; and (b) the second attachment means is disposed along the axis of rotation of the bell crank as the shift lever pivots in the north-south direction.

7. A gear shifter for a manual transmission system comprising:

(a) a support;

(b) a first movable member mounted on said support for movement in the north-south direction;

(c) an elongated shift lever, having a longitudinal axis, pivotally mounted on said first movable member for moving said first movable member in the north-south direction upon pivoting thereof in the north-south direction, said shift lever being pivotable in the east-west direction relative to said first movable member;

(d) a second movable member mounted on said support for movement in the east-west direction;

(e) means on said second movable member for connecting said shift lever thereto for pivoting movement relative thereto in the north-south direction and for movement with the second movable member in the east-west direction;

(f) a bell crank pivotally mounting on said support on a pivot post extending generally parallel to the longitudinal axis of said shift lever, said bell crank having two arms extending from said pivot post at an angle to each other;

(g) one arm of said bell crank being connected to the shift lever for pivoting movement relative thereto to cause said bell crank to pivot about its pivot post upon pivoting of said shift lever in a direction having a component of movement in the east-west direction;

(h) first attachment means on said first movable member for connecting to one end of a first actuator for moving said actuator in the north-south direction of movement of said first movable member; and (i) a second attachment means on the other arm of said bell crank for connecting to one end of a second actuator for moving said second actuator with a component of movement in the same direction as said first actuator.

8. A gear shifter for a manual transmission system comprising:

(a) a support;

(b) a first movable member mounted on said support for movement in the north-south direction;

(c) a second movable member mounted on said support for movement in the east-west direction;

(d) an elongated shift lever, having a longitudinal axis, pivotally mounted on one of said movable members for moving said one movable member in its direction of movement upon pivoting thereof in this direction, said shift lever being pivotable relative to the one movable member in a direction at 90° to the direction of movement of the one movable member;

(e) said shift lever extending through the other of said movable members, which is spaced from the one movable member axially thereof, for pivoting movement relative to the other movable member in a direction at 90° to the direction of movement of the other movable member and for movement with the other movable member in its direction of movement;

(f) a bell crank pivotally mounted on said support on a pivot post extending generally parallel to the longitudinal axis of said shift lever, said bell crank having two arms extending from said pivot post at an angle to each other;

(g) one arm of said bell crank having a slot through which said shift lever extends, said slot extending in the direction of movement of either one of said movable members and being in driven engagement with said shift lever in the direction of movement of the other movable member to cause said bell crank to pivot about its pivot post upon movement of said shift lever in the direction of movement of said other movable member;

(h) first attachment means on the movable member which moves in the direction in which the slot in the bell crank extends for connecting to one end of a first transmission actuator for moving said actuator in the direction of movement of this one movable member; and (i) a second attachment means on the other arm of said bell crank for connecting to one end of a second transmission actuator for moving said second actuator in the same direction as said first actuator.

9. A gear shifter for a manual transmission system comprising:
(a) a support;
(b) a first movable member mounted on said support for sliding linear movement in the north-south direction;
(c) a second movable member mounted on said support for sliding linear movement in the east-west direction;
(d) an elongated shift lever, having a longitudinal axis, pivotally mounted on said first movable member for moving said first movable member in the north-south direction upon pivoting thereof in this direction, said shift lever being pivotable in the east-west direction relative to said first movable member;
(e) said shift lever extends in axial sliding relation through the second movable member for pivoting movement relative thereto in the north-south direction and for movement with the second movable member in its east-west direction of movement;
(f) a bell crank pivotally mounted on said support on a pivot post extending generally parallel to the longitudinal axis of said shift lever, said bell crank having two arms extending from said pivot post at an angle to each other;
(g) one arm of said bell crank having a slot through which said shift lever extends, said slot extending in the north-south direction of movement of said first movable member and being in driven engagement with said shift lever in the east-west direction of movement of the second movable member to cause said bell crank to pivot about its pivot post upon movement of said shift lever in the east-west direction;
(h) first attachment means on the first movable member for connecting to one end of a first actuator for moving said actuator in the north-south direction of movement of the first movable member; and
(i) a second attachment means on the other arm of said bell crank for connecting to one end of a second actuator for moving said second actuator with a component of motion in the same direction as said first actuator.

10. A gear shifter according to claim 9 and including:
(a) first and second spherical bearing assemblies for connecting said shift lever to said first and second sliding members for universal rotational movement relative thereto, each of said assemblies including:
(1) a spherical ball having a central bore through which said shift lever extends, and
(2) a housing mounted in each of said sliding members and having a complementary inner surface supporting said spherical ball.

11. A gear shifter according to claim 10 and including:
(a) a third spherical bearing assembly comprising a spherical ball having a central bore through which said shift lever extends and an outer spherical surface engaged in the slot on the one arm of said bell crank.

12. A gear shifter according to claim 11 wherein:
(a) said second movable member is disposed between the first movable member and the terminal end of the shift lever; and
(b) the third spherical bearing assembly is mounted on the terminal end of the shift lever for engagement in the slot of the bell crank.

13. A gear shifter according to claim 12 wherein:
(a) the pivot post for the bell crank is disposed in the plane of movement of the shift lever in the north-south direction.

14. A gear shifter according to claim 13 wherein:
(a) the one arm of the bell crank is mounted on the pivot post to extend in the north-south direction; and
(b) the other arm of the bell crank extends at right angles to the one arm.

15. A gear shifter according to any one of claims 7 or 8-14 further including:
(a) a first pair of channel members on said support and having bearing surfaces extending in the north-south direction for slidably receiving opposite sides of said first movable member and constraining its movement in the north-south direction; and
(b) a second pair of channel members on said support and having bearing surfaces extending in the east-west direction for slidably receiving opposite sides of said second movable member and constraining its movement in the east-west direction.

16. A gear shifter according to any one of claims 7 or 8-14 further including:
(a) a gate member fixed to said support and having a central opening therein through which said shift lever extends; and
(b) said opening having a side wall disposed in the path of movement of the shift lever to limit its movement in the north-south and east-west directions.

* * * * *